Nov. 1, 1932.     N. C. CHRISTENSEN     1,886,163
PROCESS FOR THE TREATMENT OF OXIDIZED ORES
Filed Oct. 19, 1927
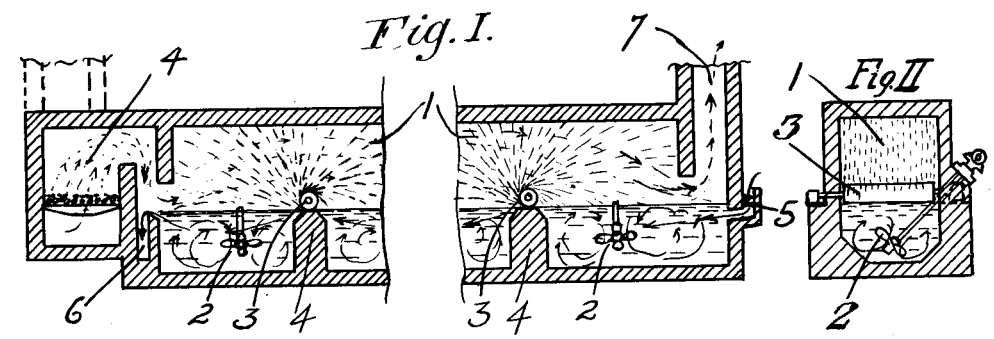
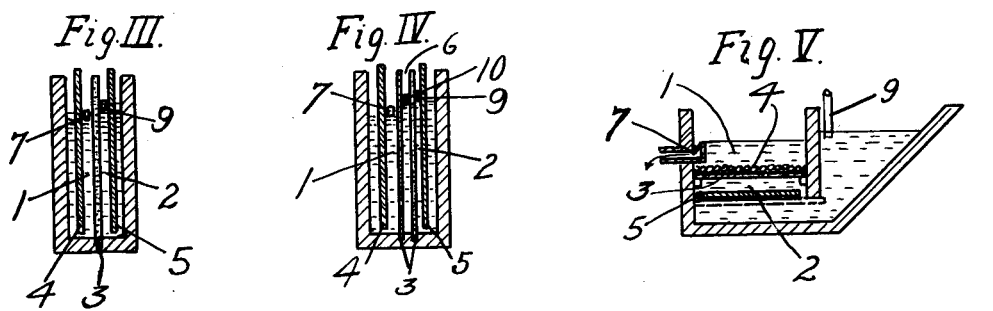
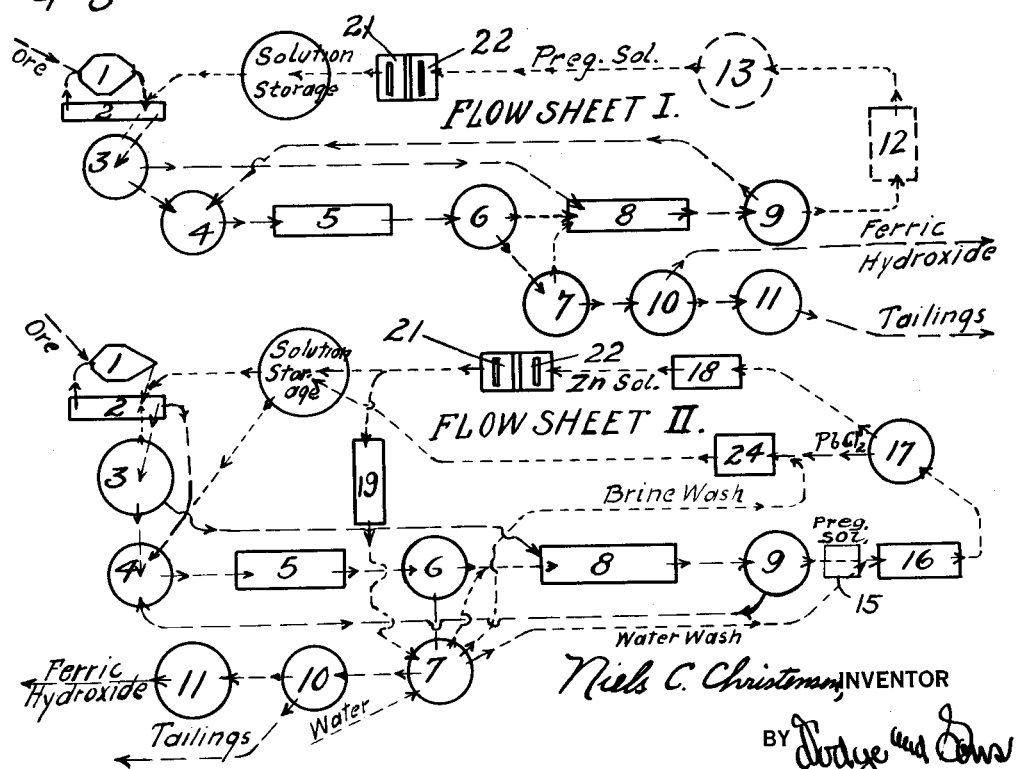

Patented Nov. 1, 1932

1,886,163

UNITED STATES PATENT OFFICE

NIELS C. CHRISTENSEN, OF SALT LAKE CITY, UTAH

PROCESS FOR THE TREATMENT OF OXIDIZED ORES

Application filed October 19, 1927. Serial No. 227,244.

This invention relates to a process for the treatment of oxidized ores, particularly to the treatment of oxidized or "carbonate" ores of zinc and mixed lead-zinc carbonate ores for the recovery of zinc and of lead and silver therefrom. The process is also applicable to the treatment of sulphide ores of zinc which have been roasted to convert the zinc sulphide to zinc oxide. Copper is also recovered in part from said ores by my process. My process is hydrometallurgical and electrolytic and aims to recover the zinc as a high grade electrolytic deposit, the lead as lead chloride or metallic lead and the silver as a metalic precipitate.

In the older processes of leaching oxidized zinc and lead-zinc ores with acid solutions and recovering the zinc from solution there are a number of serious difficulties which prevent their commercial use. One of the main difficulties occurs in the leaching of these ores with acid as it is practically impossible to filter the solutions away from many of these ores on account of the formation gelatinous silica during the leaching operation. Another of these difficulties occurs in the recovery of the dissolved zinc from the solutions, as it is practically impossible to secure a high grade zinc product by precipitation of the solutions with lime, and the cost of recovering the zinc from solution by ordinary methods of electrolysis is prohibitive in most places on account of the cost of power. To avoid the trouble caused by the formation of gelatinous silica it has been proposed to roast the ores slightly after moistening with sufficient $H_2SO_4$ to form $ZnSO_4$ (or $ZnSO_4$ and $PbSO_4$) from the zinc (or zinc and lead) minerals in the ore, but this method of treatment has not yet proved of great value. The zinc may be recovered from solution as a high grade precipitate of ZnS as described in my patent Application 66,400 and 106,567 filed respectively November 2, 1925 and May 3, 1926, but unless these ores are treated in connection with the leaching of sulphide ores of lead, the cost of the $H_2S$ for the precipitation is excessive.

My process avoids the difficulties of leaching the ores as mentioned above and reduces the cost of power for electrolytic recovery of the zinc so that the zinc may be recovered by electrolysis even though the cost of electrical power may be higher than is the case in the electrolytic zinc plants now in operation. My process also regenerates the leaching solution and may secure a useful by-product from the leaching agent which may reduce the total cost of recovering the zinc to a relatively low point.

The process consists in general of three steps, a leaching operation for dissolving the zinc or lead and zinc out of the ore and recovering the pregnant solution from the leached ore, an electrolytic operation in which the zinc (or lead and zinc) is recovered as a metallic zinc deposit and the leaching solution is regenerated, and a washing operation by which the iron oxide precipitated in the leaching operation is separated from the residue of ore. The last step may be omitted if the product cannot be marketed at a profit. The leaching operation for ores containing zinc alone is carried out by agitating and aerating the finely ground ore mixed with a solution of ferrous chloride or ferrous sulphate. I have found that the greater part of the zinc may be recovered from oxidized ores by this treatment, the zinc going into solution as zinc chloride or zinc sulphate and a chemically equivalent amount of iron being precipitated as ferric hydroxide as indicated in the following equations:

$$2ZnCO_3 + 2FeCl_2 + 3H_2O + O = 2ZnCl_2 + 2Fe(OH)_3 + 2CO_2$$
$$2ZnO + 2FeCl_2 + 3H_2O + O = 2ZnCl_2 + 2Fe(OH)_3$$
$$2ZnCO_3 + 2FeSO_4 + 3H_2O + O = 2ZnSO_4 + 2Fe(OH)_3 + 2CO_2$$
$$2ZnO + 2FeSO_4 + 3H_2O + O = 2ZnSO_4 + 2Fe(OH)_3$$

This leaching operation may be carried out with either cold or hot solutions, though the dissolving of the zinc is much more rapid and complete with hot solutions. Either ferrous chloride or ferrous sulphate solutions may be used. Ores which contain both zinc and lead may be treated with ferrous sulphate so as to bring the zinc into solution and avoid the bringing of any lead into solution such as would occur if ferrous chloride were used. These solutions may be merely water solutions of ferrous chloride or ferrous sulphate or, if the ore contains lead carbonate or sulphate and it is desired to recover the lead in the same solution with the zinc, a concentrated sodium chloride (or calcium chloride) brine containing ferrous chloride or ferrous sulphate may be used.

In the treatment of the ores containing lead carbonate or other oxidized lead minerals, with a hot brine containing ferrous chloride as described above, the dissolving of the lead is very rapid and with most ores the extraction is practically complete. The reactions by which the lead is brought into solution probably differ somewhat from those given above for the solution of the zinc. When lead carbonate is treated with a concentrated brine lead goes into solution as lead chloride and sodium carbonate is formed until a balanced condition is reached as indicated in the following equation:

$$PbCo_3 + 2NaCl \;\; PbCl_2 + Na_2CO_3$$

With a pure brine this reaction proceeds until a distinctly alkaline solution is formed. With ferrous iron in solution the balance is disturbed by the reaction between the sodium carbonate and the ferrous chloride as indicated below:

$$FeCl_2 + Na_2CO_3 + H_2O = Fe(OH)_2 + 2NaCl + CO_2$$

and the reaction between the lead carbonate and brine proceeds to completion or until all the lead is dissolved or all the iron is precipitated. The ferrous hydroxide is rapidly oxidized, by the oxygen in the gases (which come into contact with the pulp in the spraying apparatus) as indicated below:

$$2Fe(OH)_2 + H_2O + O = 2Fe(OH)_3$$

In the leaching operation the rapidity of the reaction and the completeness of the extraction of the zinc (and to a lesser degree of the lead) is dependent upon the efficiency of the aeration, and the preferred method of carrying out this part of my process is of considerable importance. My preferred method of aerating and of heating and aerating consists of spraying the mixture of ore and solution into a current of air or hot gases containing oxygen by means of the spray apparatus described in my U. S. Patent No. 1,462,363. The mixture of solution and ore is passed through a spray tunnel preferably counter-current to a flow of air or furnace gases, the pulp level being maintained so that the rapidly revolving spray cylinders dip very slightly into the pulp and throw a spray of pulp into the air in the upper part of the spray tunnel, the spray thus filling the air space in the tunnel and being intimately mixed with the gases passing through the tunnel. In this way a very intimate mixture of ore and solution and air is secured at a low cost for power. This apparatus handles ore pulps of this kind without any difficulties from shettling or clogging and is simple in construction and operation.

The accompanying drawing shows the preferred apparatus used in the process and illustrates the general methods of carrying out the process.

Figure I is a vertical longitudinal section of the leaching apparatus and Figure II is a vertical cross section of the same.

Figures III, IV and V are vertical sections of electrolytic cells which may be used in the electrolysis of the solutions.

Flow Sheets I and II illustrate two general methods of carrying out the process with different types of ores.

Figure I shows a longitudinal vertical section and Figure II a vertical cross-section of this device. As shown, the device consists of a spray tunnel (1) supplied with propeller type agitators (2) to keep the pulp in suspension and spray rotors (3) which spray the pulp into the portion of the tunnel above the pulp level. If hot solutions are to be used the hot gases passing through the tunnel come from the furnace (4) at one end of the tunnel, enough excess air being admitted with the gases of combustion to furnish sufficient oxygen for the oxidation of the iron as previously described. The method of operation of the apparatus is as follows: The mixture of pulp and ferrous solution flows into the end of the spray tunnel (1) through the inlet pipe (5) and flows out over the weir (6) at the opposite end of the tunnel. Hot gases and air (or air alone) from the fire box or furnace (4) pass through the tunnel and out of the exit stack (7), passing through the spray thrown by the rapidly revolving spray drums (3). The baffles (8) beneath the spray rotors (3) prevent the agitation of the pulp into which the rotors dip and so insure a uniform spray.

When ores are treated in the foregoing manner with ferrous solution, the resulting pulps may be filtered and washed without any difficulty though it may be impossible to filter or wash the same ores when leached with acid solutions on account of the formation of gelatinous silica in the leaching operation.

My method of recovering the zinc from the solution formed in the leaching operation (the second step in the process) consists in electrolizing the pregnant zinc solution in a permeable diaphragm cell with an iron anode, the cell being so arranged that the iron free zinc solution flows through the permeable diaphragm from the cathode into the anode compartment of the cell, thus preventing any mixing of anode solution with the cathode solution and allowing the electrolysis to proceed at a very much lower voltage than is possible with cells which use the ordinary relatively impervious diaphragms. Figures III and IV show vertical sections of such a cell, which is operated as described below. The cell is divided into two compartments, the anode compartment (1) and cathode compartment (2), by a permeable diaphragm (3). In the anode compartment an iron anode (4) is used and in the cathode compartpart a cathode plate (5) of zinc or of aluminum or other suitable material. The cell is operated as follows: purified zinc solution is passed through the cathode compartments (2) of the cell and after electroylsis is returned through the anode compartments (1) of the cell. If the cell is built as shown in Figure III, the solution in the cathode compartment is kept at such a level above the level of the solution in the anode compartment that there is sufficient flow of solution through the permeable diaphragm from the cathode compartment to the anode compartment to prevent diffusion of the anode solution through the diaphragm into the cathode compartment (or if desired all the solution may flow through the diaphragm from the cathode to the anode compartment). The cell may also be constructed, as shown in Figure IV, with a double permeable diaphragm (3) between the anode and cathode compartment, and in this case purified zinc solution is fed into the space (6) between the two walls of the double diaphragm (3) at such a rate that solution will flow through both of these walls into both the anode and cathode compartments, or a higher solution level may be used in the cathode compartment so that solution flows only from the space (6) into the anode compartment, thus preventing diffusion of the anode solution into the cathode compartment. By the use of this permeable diaphragm the cathode solution is protected against contamination and a much lower voltage may be used than is possible with the ordinary impervious diaphragm cells. When the cell is operated as described the zinc is deposited as a pure product on the cathode and iron goes into solution at the anode as a ferrous salt. The iron anode may be either cast iron pigs or plates or wrought iron or steel punchings or any other suitable form of metallic iron. If iron punchings are used they may be supported by the diaphragm or by a suitable grating or basket in the anode compartment or may be filled into the bottom of the horizontal form of the cell shown in Figure V. The solution levels in the compartments are maintained at the proper point by keeping the height of the overflow outlet (7) from the anode compartment slightly lower than the solution level in the cathode compartment. The zinc solution is fed into the cathode compartment by a suitable inlet pipe (9) and into the space (6) also by a suitable inflow pipe (10). The electrolized cathode solution flows into the cathode compartment through a suitable launder (not shown as second method is preferred) from the cathode outlet or all the solution may be allowed to flow through the diaphragm from the cathode to the anode compartment. The cathode solution may flow through a series of cathode compartments and return through a corresponding series of anode compartments or may flow from each cathode compartment into the corresponding anode compartment through the diaphragm. The solutions in the anode and cathode compartments should preferably be agitated with compressed air, or by suitable stirring mechanisms, in order to secure the highest electrical efficiency in the cell. If desired, an ordinary, relatively impervious diaphragm cell may be used for this electrolysis but this will require a much higher voltage than is required with the permeable diaphragm. By the use of the iron anode and the permeable diaphragm the voltage required in the electrolysis is reduced to the minimum.

The material of the diaphragm must be suitable for use in zinc chloride or zinc sulphate solutions and must be such as is readily made into porous plates. Such materials as porous plates of crushed quartz or fused aluminum oxide (such as the material known to the trade as "alundum") are especially suitable for this use.

The third step in the process, the recovery of the precipitated ferric hydroxide from the residue of ore consists in mixing sufficient water with the washed mixture of ore residue and precipitated ferric hydroxide to form a relatively dilute pulp, agitating the mixture and allowing the heavier particles of ore to settle and decanting the lighter, unsettled iron precipitate and allowing it to settle and thereafter filtering and drying this precipitate (which may thereafter be roasted to give the color desired and may be marketed as a pigment). A better separation of the iron hydroxide from the ore residue may be made by adding a very small amount of sodium carbonate or other suitable deflocculating agent to the pulp mixture before settling the coarser material and decanting the deflocculated precipitate of ferric hydroxide.

The method of carrying out the complete process is illustrated in Flow Sheets I and II. Flow Sheet I illustrates the method of carrying out the process upon ores which carry little or no lead or in which ferrous sulphate solutions are used so as to leave the lead in the ore residue.

Flow Sheet II illustrates the method of carrying out the process when the ore carries lead or lead and silver as well as zinc, in which case a concentrated NaCl (or $CaCl_2$) brine is used.

As shown in Flow Sheet I, the zinc ore is ground in the ball mill (1) with the ferrous solution, the ball mill being in closed circuit with a classifier (2). The overflow from the classifier (2) containing the finely ground ore, goes in part to a thickener (3) and in part to the regulating tank (4). In the tank (4) the mixtures of ore and solution from the classifier (2) and from the thickener (3) are proportioned and mixed or mixed and diluted with more ferrous solution, according to the ratio of ore to solution which is desired in the leaching circuit, which will depend on the grade of ore being treated. If desired the ore may be ground in water and thickened and filtered, and then mixed with the ferrous solution in the regulating tank (4), but grinding in the ferrous solution saves the thickening and filtering operation and avoids dilution of the leaching solution. The mixture of ground ore and ferrous solution from the regulating tank (4) flows through the spray tunnel (5) in which the sprayed pulp is thoroughly agitated and aerated, and preferably heated with hot furnace gases as described above. During this treatment in the combined agitator aerator and heater (5) the zinc in the ore is brought into solution and iron is precipitated from solution as ferric hydroxide as previously described. If it is desired to make as complete a recovery as possible of the Zn (and silver) an excess of ferrous salt is used in the solution. This will extract practically all of the zinc, but if this treatment is too prolonged or does not recover all the zinc or silver if silver is present, a small amount of acid may be added near the exit end of the aerator—agitator (5) which will bring the last of the zinc and silver into solution. The mixture of zinc solution and treated ore flows to a thickener or dewaterer (6) from which the thickened underflow goes to the filter (7) and the clear over flow (or filtrate if a filtering dewaterer is used) containing zinc and some residual iron in solution goes to the second agitator-heater-aerator (8) in which it is mixed with the thickened underflow of ore pulp from the thickener (3) and again agitated and aerated (and preferably also heated) so as to precipitate the residual iron left in solution after the first treatment so as to give a pure zinc solution. The mixture of ore and solution from the second agitator and aerator (8) goes to the second thickener or dewaterer (9) from which the thickened underflow goes to the mixing tank (4) and the clear purified solution overflow (or filtrate) goes to the electrolytic circuit. The thickened underflow from the first thickener or dewaterer (6) is filtered and washed in the filter (7) the filtrate going into the second agitator and aerato (8) with the clear solution from the first thickener or dewaterer (6). The filtered and washed residue of treated ore from the filter (7) goes to the deflocculating tank (10) in which it is mixed with water and a small amount of a soluble deflocculating agent. The settled thickened underflow of residual ore from this tank (10) goes to waste or to a flotation treatment if it contains sulphide minerals or gold and silver which are recoverable by flotation, and the overflow containing the suspended ferric hydroxide goes to the settling tank (11) in which the ferric hydroxide is settled out and recovered. If a complete recovery of zinc is not desired the process may be carried out by using an excess of ore in the first agitator and aerator (5) thus securing a complete precipitation of the iron. In this case the second agitator and aerator (8) and second dewaterer (9) may be omitted from the leaching circuit and the thickener (3) may be omitted from the grinding circuit.

The clear zinc solution from the leaching circuit passes into the cathode compartment (22) of the electrolytic cell where zinc is deposited and then flows through the anode compartment (21) of the cell and is regenerated by the ferrous iron taken into solution from the iron anode as described above. This regenerated ferrous solution is then used over again on the treatment of more ore as described, being returned to the grinding circuit and regulating tank as shown on the flow sheet.

If a ferrous chloride solution is used and the ore contains lead, the lead brought into solution as lead chloride by the action of the hot ferrous chloride solution in the two combined aerator-agitator-heaters (5) and (8) must be removed from solution before the zinc electrolysis can be carried out. This may be done by passing the hot pregnant solution from the second dewaterer (9) through a heater and agitator (12) shown dotted in which the hot solution is mixed and heated with finely divided $CaCO_3$ in the ratio of one molecular weight of $CaCO_3$ to one molecular weight of $PbCl_2$ in solution, which treatment causes the precipitation of all the lead as a basic double salt of $PbCl_2$ and $CaCO_3$. This salt is a brilliant white granular product which settles out rapidly in the settler (13) (shown dotted) from which the clear clean zinc chloride solution overflow goes to electrolytic department. The lead precipitate may be smelted for recovery of the lead by mixing with carbon and heating to a bright red heat, the resulting products being metallic lead and a $CaCl_2$ slag. If the ores contain only small amounts of copper and lead which go into solution the copper may be precipitated with metallic lead and the lead thereafter by means of metallic zinc thus giving a pure $ZnCl_2$ solution for electrolysis.

When the zinc ore contains lead the zinc may be removed by treatment with a ferrous sulphate solution so as to leave the partially or completely sulphated lead in the residue from which it may be recovered by leaching with a concentrated preferably slightly acid brine.

My preferred method of treating the socalled mixed carbonate ores of lead and zinc consists, however, in leaching them with a concentrated sodium chloride solution (or calcium chloride solution) containing ferrous chloride, the treatment being carried out in a manner similar to that described above for water solutions. Flow Sheet II shows in a general way the method of treating these ores with a brine for the recovery of both the lead and zinc and silver.

The ore is ground with brine containing ferrous chloride in the ball mill (1) which is in closed circuit with the classifier (2) from which the mixture of finely ground ore and brine flows in part to the thickener (3) and in part to the regulating tank (4). During this grinding and classifying treatment the lead in the ore may be partly chloridized and if a hot solution is used a considerable part of the lead may be brought into solution. In the regulating tank (4) the proper proportion of solution to ore is secured by either mixing some of the thickened underflow of pulp from the thickener (3) with the dilute pulp from the classifier (2) or by adding more ferrous brine, in a manner similar to that described above for Flow Sheet I. The properly proportioned mixture of ore and brine from the regulating tank (4) passes through the agitator-heater-aerator (5) in which the solution is evaporated and heated and thoroughly aerated by mixture with the hot gases from the furnace at the end of the spray tunnel. During this treatment the lead, zinc and silver are brought into solution and iron is precipitated as ferric hydroxide. If as complete a recovery as possible is desired an excess of ferrous chloride is used in solution and if the treatment required for practically complete recovery is too long or the recovery of lead, zinc or silver is not complete enough a small amount of acid may be added at near the exit end of the leaching agitator (5) which will bring the residual lead, zinc and silver (and part of the oxidized copper) into solution.

The hot leached pulp from the first agitator-aerator-heater (5) flows to the thickener or dewaterer (6) from which the clear filtrate (or overflow) is discharged to the second agitator-aerator-heater (8) and the thickened underflow goes to the filter (7) in which the residue of pregnant solution is filtered out and the residue of leached ore and precipitated iron hydroxide is washed first with brine and then with hot water and is discharged to waste or flotation or sold to the lead smelter as an iron flux or treated for the recovery of the ferric hydroxide as described above. The partially pregnant solution from the dewaterer (6) and filter (7) enters the second agitator-aerator-heater (8) together with an excess of thickened underflow of ore from the thickener (3) and in passing through this leaching agitator (8) the residue of iron in solution is completely precipitated by means of the excess lead and zinc carbonate in the ore. The hot pulp passes from the agitator (8) to the second dewaterer (9) from which the hot clear clean pregnant lead-zinc brine goes to the precipitation circuit and the thickened underflow goes to the regulating tank (4) at the head of the leaching circuit. The brine wash from the filter (7) is used in dissolving the precipitated $PbCl_2$ as described below, and the water wash from the filter (7) goes to the precipitation circuit where it is mixed with the pregnant solution at the head of the spray cooler (16).

The hot pregnant solution from the second thickener or dewaterer (9) passes through the silver precipitation box (15) in which the silver is removed from solution by means of metallic lead, and then goes to the cooler (16). If the solution contains copper (which is recovered from the ore by the leaching treatment described above) the silver may first be removed by precipitation with metallic copper and the copper by precipitation with metallic Pb.

The mixture of pregnant silver free solution and water wash is then cooled by passing through the spray cooler (16). This spray cooler (16) is a device of the same kind as that shown in Figures I and II except that cold air is passed through the spray instead of hot air or hot gases. The diluted pregnant solution passes through the spray tunnel in one direction and the cold air passes through the tunnel in the opposite direction, the solution being cooled by this intimate contact with the air and by the evaporation secured. This cooling and dilution of the pregnant solution precipitates most of the lead chloride which is carried out of the cooler (16) in suspension in the cold diluted solution which flows to the $PbCl_2$ settler (17) in which the $PbCl_2$ is settled out. The settled lead chloride is dissolved in the hot concentrated wash brine and electrolyzed for the recovery of the lead with an iron anode in electrolytic cells (24) as described in my U. S. Patent No. 1,390,603 and the ferrous chloride brine thus formed returns to the head of the leaching circuit as shown. The overflow of solution from the $PbCl_2$ settler (17) is then passed through the final lead precipitator (18) in which the residue of unprecipitated Pb is precipitated by means of metallic zinc, giving a clean zinc brine for electrolysis.

The clean zinc brine goes to the electrolytic cells in which the solution is electrolyzed for the recovery of the zinc and regeneration of the ferrous chloride as previously described, the solution first passing through the cathode compartment (22) of the cell in which zinc is deposited and then through the anode compartment (21) in which ferrous chloride is formed and dissolved in the brine. The electrolyzed solution containing ferrous chloride and the residue of unprecipitated zinc is divided into the two streams, one portion returning to the head of the leaching and grinding circuit, as shown in the flow sheet, and the other portion passing through the brine heater and evaporator (19) in which the solution is concentrated and heated to form the brine wash for washing the cake in the filter (7) which is then used to dissolve the $PbCl_2$ and after electrolysis to recover the lead is returned to the head of the circuit as shown. The amount of wash water is usually sufficient to make up for the evaporation loss in the leaching agitators (5) and (8) and brine wash heater (19). Since all the wash water is evaporated there is no building up of solution and no necessity for bleeding to waste and therefore a considerable circulating load of zinc can be carried without any loss of zinc due to the accumulation of waste solutions. The washed residue of ore and precipitated ferric hydroxide from the filter (7) is sent to the deflocculating tank (10) and treated for the recovery of the ferric hydroxide as previously described.

One of the great advantages of this process of treating zinc ores and lead-zinc ores by hydrometallurgical and electrolytic methods is that deleterious elements are not dissolved out of the ore and the solutions are sufficiently pure for electrolysis without special cleaning treatment such as is required with processes in which the ores have been leached with acid solutions. By the process described in the foregoing a high recovery of zinc or of zinc, lead and silver may be secured from practically all classes of oxidized zinc and lead-zinc ores. The general description given in the foregoing illustrates my preferred general method of carrying out the process and is not intended to limit the process to the particular procedure or apparatus described except in so far as the process is described and limited by the accompanying claim, as it will be apparent that in the practical operation of the process a large number of minor variations are possible and necessary in the treatment of ores of different kinds and of different grades.

Having described my process what I claim and desire to patent is:

The process of treating oxidized ores, and the like, containing lead and zinc for the recovery of lead and zinc therefrom which consists in mixing said ores with a concentrated sodium chloride brine containing dissolved iron in the ferrous condition and beating and agitating and aerating said mixture and thereby dissolving zinc and lead out of said ore in said solution and precipitating iron from said solution as ferric hydroxide and thereafter diluting and cooling said brine and precipitating lead chloride therefrom and precipitating the residual lead from said solution with metallic zinc, and precipitating zinc from said solution by electrolysis with an iron anode so as to form ferrous chloride in said solution, and heating last said brine containing ferrous chloride and dissolving above said precipitated lead chloride therein and recovering the lead therefrom by electrolysis with an iron anode so as to form ferrous chloride in said solution, and using said brines containing said ferrous chloride in the treatment of more ore.

In testimony whereof I have signed my name to this specification.

NIELS C. CHRISTENSEN.

CERTIFICATE OF CORRECTION.

Patent No. 1,886,163.                                                                               November 1, 1932.

NIELS C. CHRISTENSEN.

It is hereby certified that error appears in the printed specification of the above numbered patent requiring correction as follows: Page 6, line 58, the claim, for "beatig" read heating; and that the said Letters Patent should be read with this correction therein that the same may conform to the record of the case in the Patent Office.

Signed and sealed this 29th day of November, A. D. 1932.

M. J. Moore,
(Seal)                                          Acting Commissioner of Patents.